J. Trees.
Screw Propeller.

Nº 10,164.   Patented Oct. 25, 1853.

UNITED STATES PATENT OFFICE.

JAMES TREES, OF SALEM, PENNSYLVANIA.

PROPELLER.

Specification of Letters Patent No. 10,164, dated October 25, 1853.

*To all whom it may concern:*

Be it known that I, JAMES TREES, of Salem, in the county of Westmoreland and State of Pennsylvania, have invented certain new and useful Improvements in Submerged Propellers; and I do hereby declare the following to be a full, clear, and exact description of the same, reference being had to the accompanying drawings, making a part thereof, in which—

Figure 1:
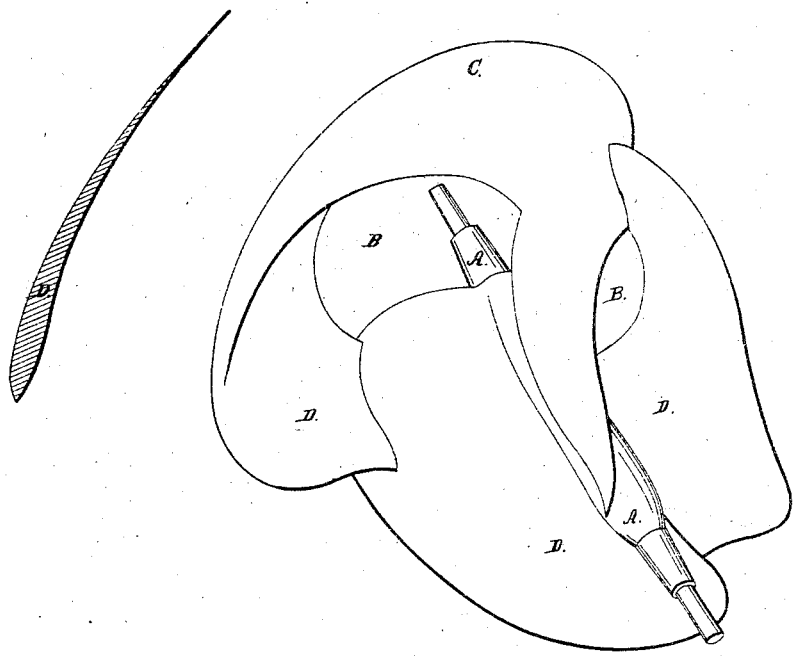
Figure 2:
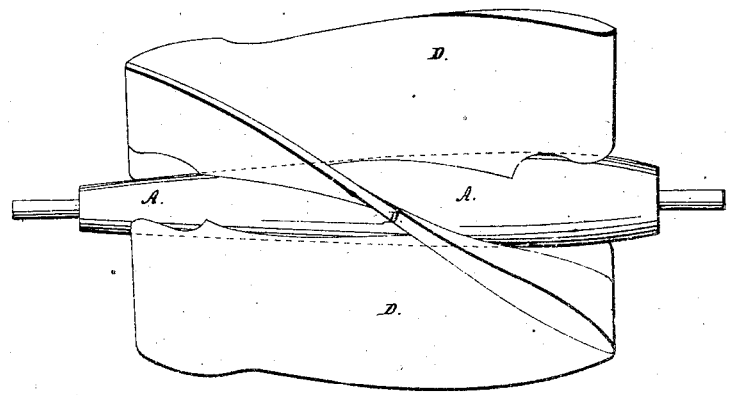

Figure 1 represents a propeller with helical tubes; and Fig. 2 represents a propeller with helical floats, vanes, or buckets without the shell, similar letters in both the figures representing corresponding parts.

Letters Patent of the United States were granted to me on the 14th day of May A. D. 1850, for giving the shell of a submerged propeller the form of a section cut from the open extremity of sea shells (of the class represented in the said patent)—the mouth of the helical tube at which the water enters being of greater area than its hinder extremity at which the water is discharged.

The nature of my present invention consists in the application to submerged propellers whose area where the water enters is greater than the hinder extremity where the water escapes, of blades or vanes, and a shaft to which they are attached all tapering from front to rear. Assuming as the front of said blades and shaft, that part where the blades first impinge upon the water, and where the propulsion commences.

To enable others skilled in the art to make and use my invention I will proceed to describe the same with reference to the drawings.

Fig. 1 represents one of the class of propellers represented in the patent above referred to, but in which my improvements are incorporated, viz: the shaft A is made to taper rearward, at an angle varying from two to five degrees, which taper, however, must depend to a great extent upon the length of the propeller or its shaft. The taper of the shaft rearward, should commence at or near the point, where the fronts of the blades are attached to it, and from this point forward the shaft should be made conical, so as to enter the water easily, not presenting a too abrupt surface to the action of the water. B, represents the helical tubes, of the form described in my patent, above referred to; C, the shell or periphery of the propeller, and D, the blades or vanes, which also are thickest at their fronts, and taper off to a sharp edge at the rear, as shown in the section D, detached, which is taken through the blade in a line parallel with the shaft, the object being to present the thickest part of the shell and blades, as well as of the shaft, first to the water, and to effect a more easy passage through the water; the blades and shaft being shaped somewhat like the horizontal water lines of a ship or other vessel.

Fig. 2 represents the application of this general principle to propellers of more common forms, but where the same respective areas of mouth or inlet, and discharge are maintained. A, represents the tapering shaft, and D, the blades or vanes helically arranged around the shaft, having their fronts thickest, and tapering to the rear, as seen on the edge of one of the blades in said Fig. 2. In this case as in the former the blades and shaft both taper rearward from or near the point where they begin to catch hold of the water or to act in propelling. Forward of this point the shaft is rounded off, as well as the ends of the blades, so as, to operate as a wedge in dividing the water, and not to present a retarding surface.

Having thus fully described the nature of my invention what I claim therein as new, and desire to secure by Letters Patent is:

The combination with submerged propellers, whose area where the water enters is greater than the hinder extremity where the water escapes, of helical blades or vanes and a tapering shaft to which they are attached, both the blades and shaft tapering from front to rear, substantially in the manner and for the purpose set forth.

JAMES TREES.

Witnesses:
JOHN HUGUS,
SAMUEL BISHOP.